(12) United States Patent
Kaneko

(10) Patent No.: US 7,660,283 B2
(45) Date of Patent: Feb. 9, 2010

(54) WIRELESS COMMUNICATION TERMINAL AND CONTROL METHOD THEREFOR

(75) Inventor: Takahiro Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 692 days.

(21) Appl. No.: 10/806,436

(22) Filed: Mar. 23, 2004

(65) Prior Publication Data

US 2004/0192224 A1 Sep. 30, 2004

(30) Foreign Application Priority Data

Mar. 27, 2003 (JP) ............................. 2003/087283

(51) Int. Cl.
*H04W 4/00* (2009.01)
(52) U.S. Cl. .................... 370/332; 370/331; 455/335.1; 455/335.2; 455/552.1
(58) Field of Classification Search ............... 370/331, 370/332, 333, 227, 228, 329; 455/336, 434, 455/435.2, 435.3, 450, 452.2, 453, 464, 552.1, 455/115.1, 115.2, 67.11, 513, 550.1, 552.2, 455/417, 436
See application file for complete search history.

(56) References Cited

U.S. PATENT DOCUMENTS

| | | | | |
|---|---|---|---|---|
| 4,554,656 A * | 11/1985 | Budrikis et al. | ............ | 370/445 |
| 5,450,613 A * | 9/1995 | Takahara et al. | ............ | 455/517 |
| 5,659,598 A * | 8/1997 | Byrne et al. | ............... | 455/436 |
| 5,966,667 A | 10/1999 | Halloran et al. | | |
| 6,088,348 A * | 7/2000 | Bell et al. | ................... | 370/343 |
| 6,363,246 B1 * | 3/2002 | Williams et al. | ............ | 455/403 |
| 6,363,260 B1 | 3/2002 | Achour et al. | | |
| 7,003,315 B2 * | 2/2006 | Kiyomoto et al. | ........ | 455/552.1 |
| 7,054,634 B2 * | 5/2006 | Watanabe et al. | .......... | 455/440 |
| 7,065,360 B2 * | 6/2006 | Yahagi | ........................ | 455/437 |
| 7,089,005 B2 * | 8/2006 | Reddy | ......................... | 455/436 |
| 7,155,229 B2 * | 12/2006 | Dent | ........................... | 455/450 |
| 2001/0009853 A1 * | 7/2001 | Arimitsu | ..................... | 455/434 |
| 2002/0177418 A1 * | 11/2002 | Kido | ............................ | 455/90 |
| 2003/0017842 A1 | 1/2003 | Moles et al. | | |
| 2003/0129978 A1 * | 7/2003 | Akiyama et al. | ............ | 455/426 |

FOREIGN PATENT DOCUMENTS

| | | |
|---|---|---|
| DE | 200 00 254 | 1/2000 |
| EP | 1 117 266 | 7/2001 |
| GB | 2 333 423 | 7/1999 |
| JP | 11-55754 | 2/1999 |

(Continued)

OTHER PUBLICATIONS

European Search Report dated Dec. 5, 2006.

(Continued)

*Primary Examiner*—Jean A Gelin
(74) *Attorney, Agent, or Firm*—McGinn IP Law Group, PLLC

(57) ABSTRACT

A dual mode mobile wireless communication terminal detects a reception field level of another second communication system when the reception field level of a first communication system, with which communication is currently taking place, has dropped to or below a prescribed threshold. When the second communication system has priority, the terminal selects the second communication system. When prescribed operation is executed on the terminal, the terminal can also detects a reception field level of another second communication system.

23 Claims, 7 Drawing Sheets

FOREIGN PATENT DOCUMENTS

| | | |
|---|---|---|
| JP | 11-284554 | 10/1999 |
| JP | 2000-92541 | 3/2000 |
| JP | 2000-333242 | 11/2000 |
| JP | 2002-271534 | 9/2002 |
| JP | 2003-503988 | 1/2003 |
| WO | WO 95/17077 | 6/1995 |
| WO | WO 00/65738 | 2/2000 |
| WO | WO 01/03464 | 1/2001 |
| WO | WO 01/58190 | 8/2001 |

OTHER PUBLICATIONS

Japanese Office Action dated Jun. 10, 2008, with partial English translation.

Chinese Office Action with English Translation dated Jan. 6, 2006.

* cited by examiner

# WIRELESS COMMUNICATION TERMINAL AND CONTROL METHOD THEREFOR

BACKGROUND OF THE INVENTION

1. Field of the Invention

The present invention relates to a wireless communication terminal and a control method therefor, and more particularly to a wireless communication terminal which switches over the choice of wireless communication system according to the state of radio wave reception, and a control method for the terminal.

2. Description of the Related Art

A dual mode wireless communication terminal is used in an environment in which a plurality of communication systems are coexistent, and switches over the choice of wireless communication system according to the state of radio wave that is received. A conventional dual mode wireless communication terminal periodically detects the reception field level of another communication system, and determines whether or not to switch over from one communication system to another on the basis of the detected level.

However, it is difficult by this method to quickly switch over from the communication system currently in use to another communication system because the level is detected at rather long intervals. On the other hand, if the intervals are shortened, the battery consumption will increase. According to the conventional method, it may sometimes be impossible to continue to use the currently chosen communication system until the next level detection. Moreover, even if the other communication system has priority, no preferential switch-over is possible.

SUMMARY OF THE INVENTION

A wireless communication terminal according to the present invention is provided with an operating unit, reception field level detecting means for detecting the field level of the received radiowave, a control unit for controlling the terminal, a storage unit, a plurality of wireless communication units each matching a different communication system, and switch-over means for switching over from one to another of the wireless units. On the basis of the reception field level of a first communication system that is currently selected and that of another second communication system, the terminal selects one of these communication systems.

The terminal can execute, when the reception field level of the first communication system that is currently selected has become equal to or below a first threshold, detection of the reception field level of the second communication system. This terminal may be further provided with a detection unit for detecting a prescribed operation of the terminal. When the prescribed operation is done at the terminal, the terminal can execute detection of the reception field level of the second communication system.

When the reception field level of the first communication system is equal to or below a second threshold which is lower than the first threshold and communication with the second communication system is possible, the terminal can select the second communication system. Further, when the second communication system has priority and communication with the second communication system is possible, the terminal can either issue a notice signal or select the second communication system.

A control method for a wireless communication terminal in accordance with an aspect of the invention can have a step of detecting, when the reception field level of the first communication system that is selected is at or below a prescribed threshold, the reception field level of the second communication system, and a step of selecting either communication system on the basis of the reception field levels of the two communication systems.

A control method for a wireless communication terminal in accordance with another aspect of the invention can have a step of detecting whether or not a prescribed operation has been done on the terminal, a step of detecting, when the prescribed operation has been done, the reception field level of another second communication system than the first communication system that is selected then, and a step of selecting either communication system on the basis of the reception field levels of the two communication systems.

In the examples of the invention described above, the wireless communication terminal can promptly execute switching-over from the currently selected communication system to another communication system.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
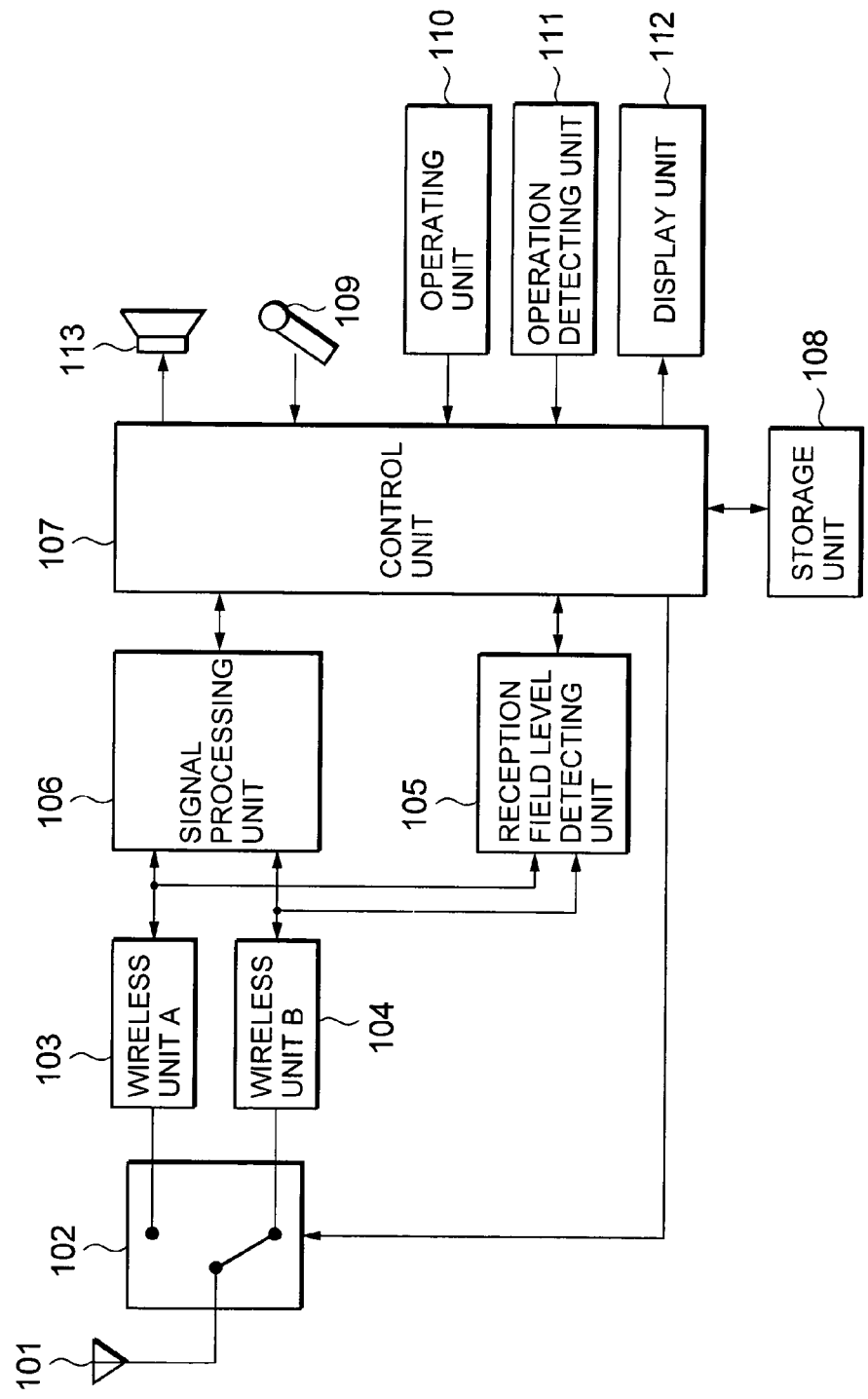
FIG. 1 is a block diagram of a wireless communication terminal according to a preferred embodiment of the invention.

Referring to FIG. 1, a wireless communication terminal according to a preferred embodiment of the invention, is provided with a transmission/reception antenna 101, wireless units 103 and 104 for controlling the transmission/reception of wireless signals, and a signal processing unit 106. The two wireless units 103 and 104 match different communication systems. The terminal is also provided with a wireless switch-over unit 102, a reception field level detecting unit 105 and a control unit 107. The wireless switch-over unit 102 switches over the wireless communication system in accordance with a control signal from the control unit 107. The reception field level detecting unit 105 detects the reception field level of a radio wave transmitted from a base station of a mobile wireless communication system, and notifies the detected level to the control unit 107. The terminal is further provided with a storage unit 108, a speaker 113, a microphone 109, an operating unit 110, an operation detecting unit 111 and a display unit 112. The storage unit 108 stores programs executed by the control unit 107 and data, and holds the reception field level detected by the detecting unit 105. The operation detecting unit 111 detects whether a foldable terminal is folded or unfolded, and notifies the detected state to the control unit 107. The control unit 107, upon receipt of this notification, can turn on power supply if the terminal is unfolded, or can turn it off if the terminal is folded. The operation detecting unit 111 also notifies the control unit 107 of whether or not the operating unit 110 has been worked on and, if the terminal has a specific key, whether or not the key has been operated. The control unit 107, upon receipt of any of these notifications, controls the reception field level detecting unit 105 so as to start detecting the reception field level of the communication system. The operating unit 110 is a key input device, provided with a power switch, a numeric key assembly for entering telephone numbers, a call start/end key, an input key for data communication, and the aforementioned specific key among others. The control unit 107 also exercises overall control over the whole terminal in addition to those individual controls. The wireless communication terminal, during operation, detects the reception field level of the selected communication system either constantly or at prescribed intervals. The storage unit 108 can store information on whether or not any communication system has priority.

Figure 2:
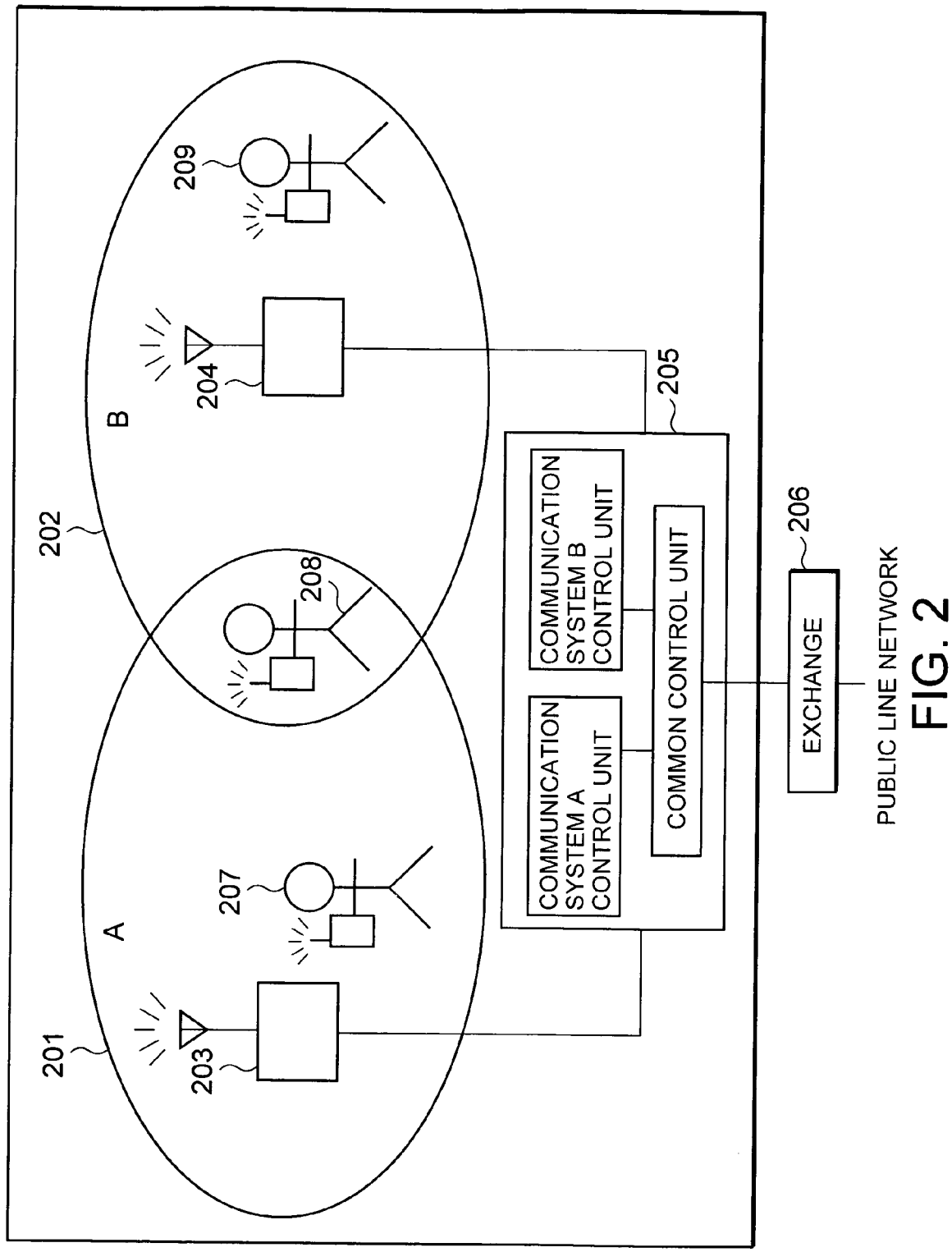
FIG. 2 shows an example of mobile communication system provided with two communication systems.

FIG. 2 shows an example of mobile communication system to which two wireless communication systems are available. A service area of a communication system A and that of a communication system B partly overlap each other. A user 207 performs wireless communication with a base station 203, and a user 209 performs wireless communication with a base station 204. In performing communication, a user having a dual mode wireless communication terminal can switch over the terminal from one communication system to another to match the service area. A wireless line control station 205, connected to a plurality of base stations, controls the communication systems A and B. An exchange 206 connected to a public network is connected to the wireless line control station 205. A user 208 staying in an area where the communication system A and the communication system B overlap each other can communicate with either the communication system A or the communication system B as required. Also, the terminal of the user 208 can automatically select another communication system in accordance with the present invention.

Figure 3:
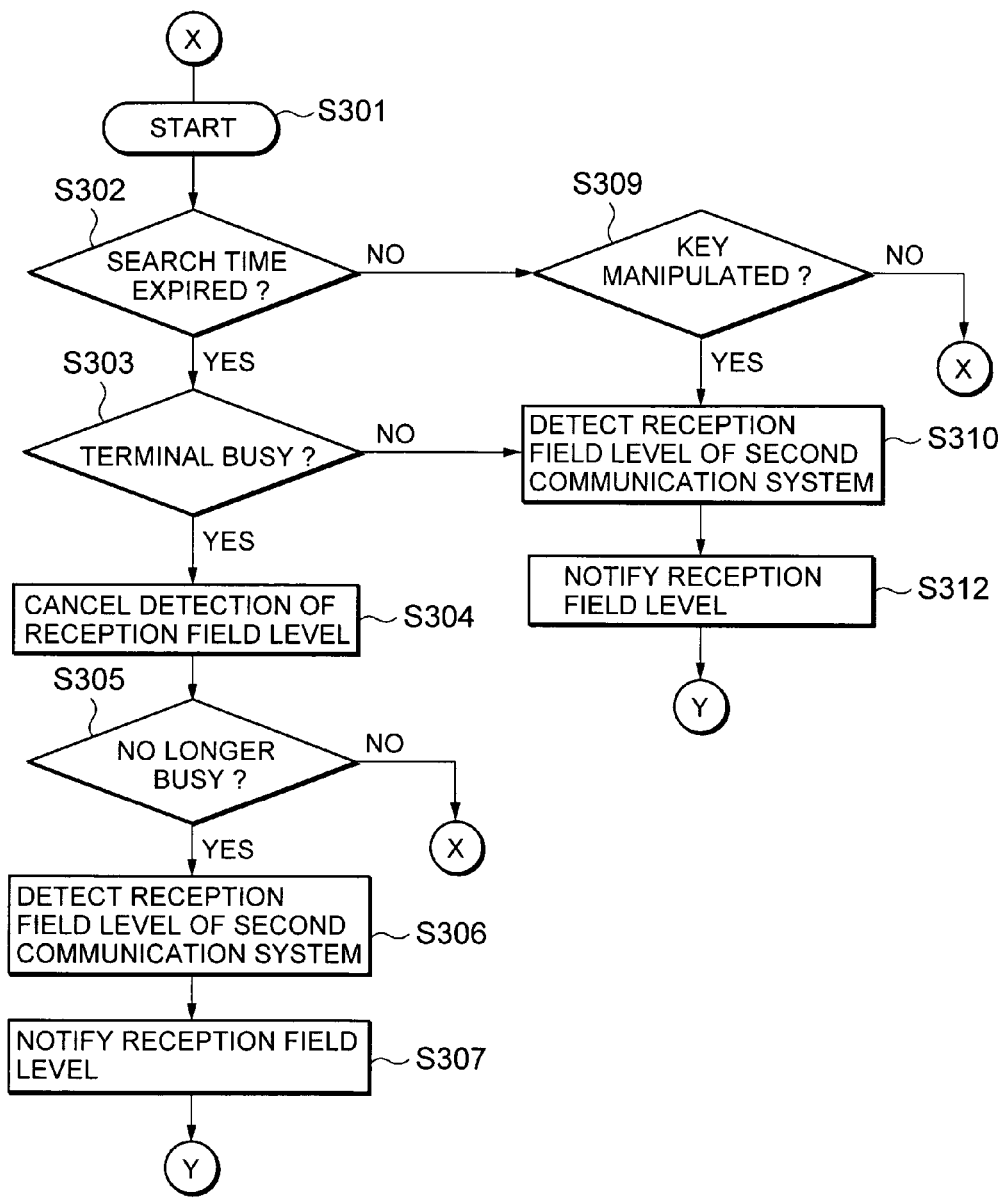
FIG. 3 shows the flow of one example of control over a communication system.

FIG. 3 is a flow chart of one example of a communication control method. This example shows an operation mainly executed by the terminals of the users 207 and 209 shown in FIG. 2. The wireless communication terminal detects the reception field level of a second communication system, other than a first communication system in current use, at every prescribed time count set on a timer. First it is determined whether or not the time count set on the timer has expired (S302). Before this time count expires, it is determined whether or not the user has manipulated the specific key, whether or not the user has operated the operating unit 110, and whether the user has unfolded the foldable terminal (S309). If it is determined that either action has been taken (YES at S309), the control unit 107 will control the wireless switch-over unit 102 to switch over from the first communication system, from which signals are being received, to the other second communication system, and controls the reception field level detecting unit 105 to start detection of the reception field level of the second communication system (S310). The detected reception field level is notified to the control unit 107, which holds it in the storage unit 108 (S312).

Figure 4:
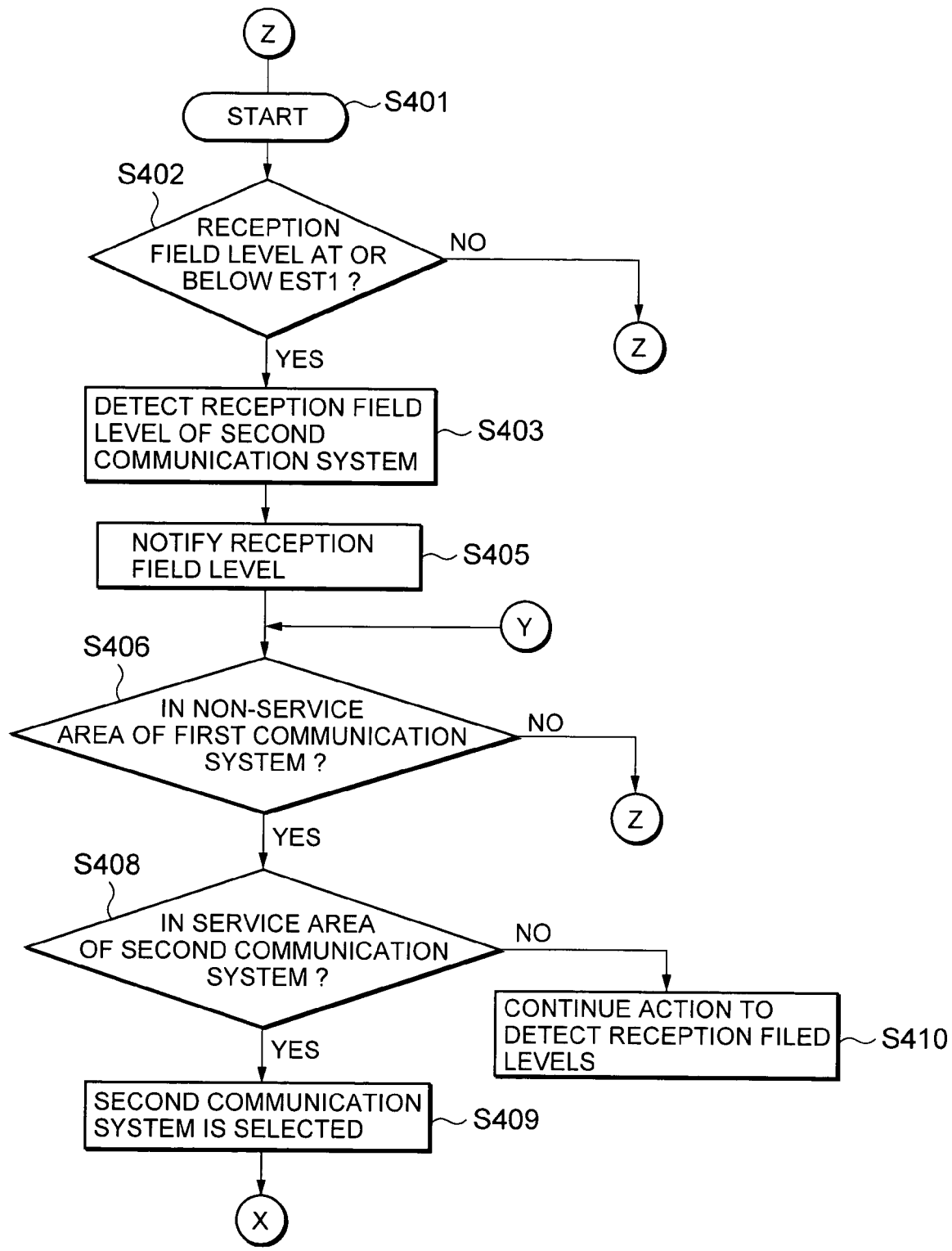
FIG. 4 shows the flow of another example of control over the communication system.

If the set time count has expired (YES at S302), it will be determined whether or not the terminal is busy (S303). If the terminal is not busy, the above-described steps S310 and S312 will be executed. If the terminal is busy, the detection of the reception field level will be canceled (S304). When the terminal has ended its call (YES at S305), the reception field level of the second communication system is detected (S306). The detected level is notified to the control unit 107 and held by the storage unit 108 (S307). The level stored in the storage unit 108 is used as a datum for switching over the communication system as shown in FIG. 4. Incidentally, it is not absolutely necessary for the wireless communication terminal according to the invention to have the function to detect the reception field level of the second communication system at prescribed intervals of time.

FIG. 4 is a flow chart showing another example of communication control method. This example is mainly executed by the terminal of the user 208 shown in FIG. 2. After the start of control (S401), it is determined whether or not the reception field level (Est) of the currently selected first communication system is at or below a threshold (Est1) held by the storage unit 108 (S402). If it is determined that the reception field level (Est) is at or below the threshold (Est1) (YES at S402), detection of the reception field level of the second communication system is started (S403). The detected reception field level is notified to the control unit 107, and the control unit 107 holds it in the storage unit 108 (S405).

There are a number of alternatives available for accomplishing the rest of the control. By the method shown in FIG. 4, it is determined whether or not the terminal can communicate with the currently selected first communication system (i.e. whether or not the terminal is in a non-service area of the first communication system) (S406). If it cannot (YES at S406), it will be determined whether or not communication with the second communication system is possible (i.e. whether or not the terminal is in the service area of the second communication system) (S408). If the terminal can communicate with the first communication system (NO at S406), this ongoing communication will be maintained. If the terminal can communicate with the second communication system (YES at S408), the second communication system will be selected (S409). If at step S408 communication with the second communication system is found impossible (NO at S408), the action to detect the reception field levels of the first and second communication systems will continue (S410). In the control method charted in FIG. 4, step S406 can be dispensed with irrespective of whether or not the second communication system has priority. If communication with the second communication system is possible, the terminal will immediately select that communication system.

Figure 5:
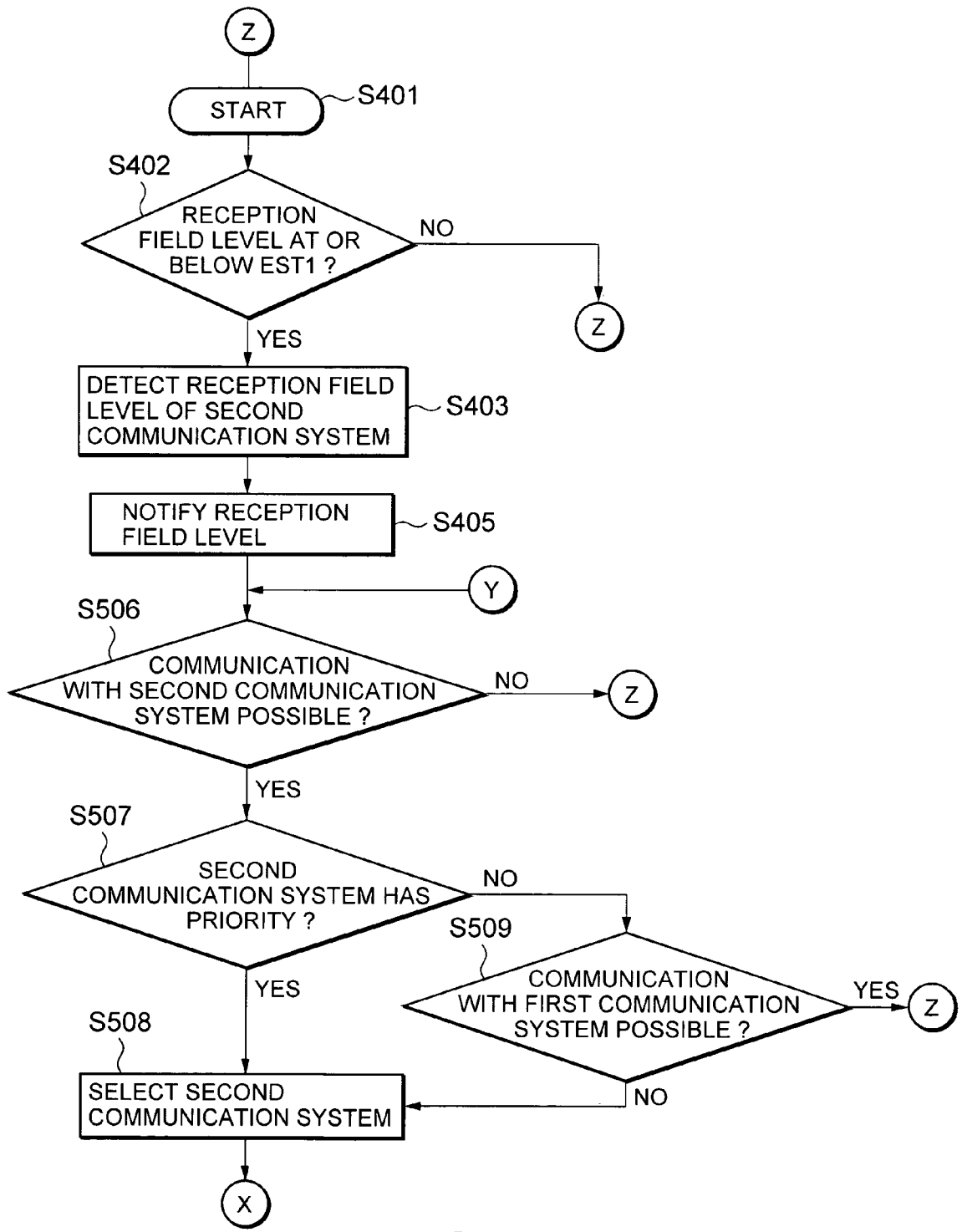
FIG. 5 shows the flow of still another example of control over the communication system.
Figure 6:
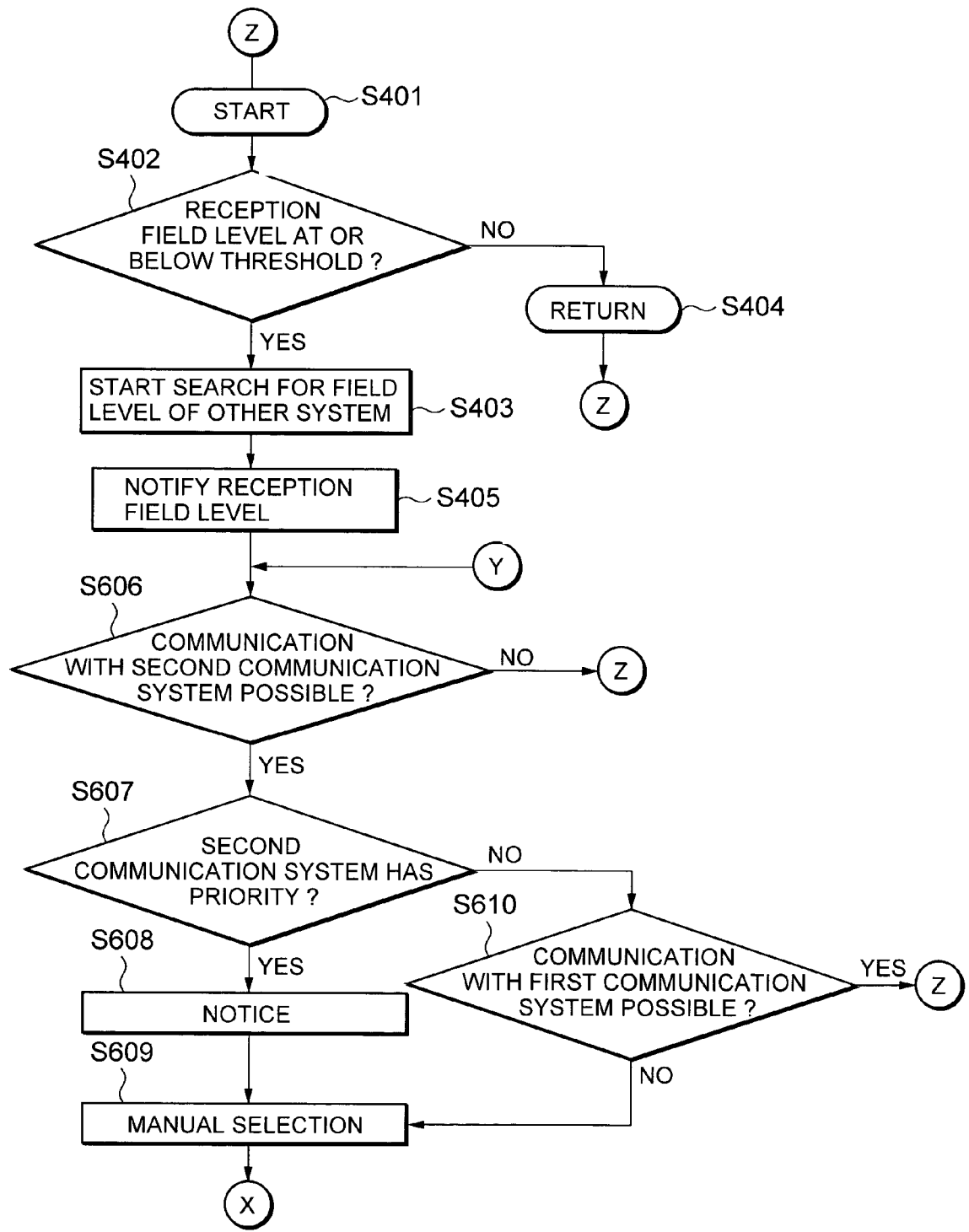
FIG. 6 shows the flow of yet another example of control over the communication system.

FIG. 5 and FIG. 6 show control methods to be executed where the second communication system has priority. In FIG. 5, steps S401 through S405 are the same as the respectively corresponding steps in FIG. 4. After the reception field level of the second communication system is detected, it is determined whether or not the terminal can communicate with the second communication system (S506). If communication is found possible, it will be determined whether or not the second communication system has priority (S507). If the second communication system is found to have priority, the terminal will select the second communication system (S508). If the second communication system is found to have no priority, it will be determined whether or not the terminal can communicate with the currently selected first communication system (S509). If communication with the first communication system is found possible (YES at S509), the terminal will maintain its ongoing communication with the first communication system. If communication with the first communication system is found impossible (NO at S509), the terminal will select the second communication system.

FIG. 6 has steps S401 through S405 of FIG. 4. Further, steps S607, S608 and S610 in FIG. 6 are respectively the same as S506, S507 and S509 in FIG. 5. By the control method shown in FIG. 6, if it is determined that the second communication system has priority, the terminal will give a notice (S608). The notice may be emission of a sound from a speaker, a display on a display unit, or vibration of a motor for instance. The user of the terminal, in response to this notice, manually operates the terminal and selects the second communication system (S609). In the control described above, if the reception field level of the communication system drops to or below a second threshold (Est2), which is lower than the first threshold (Est1), it will be determined that the terminal cannot communicate with that communication system.

Figure 7:
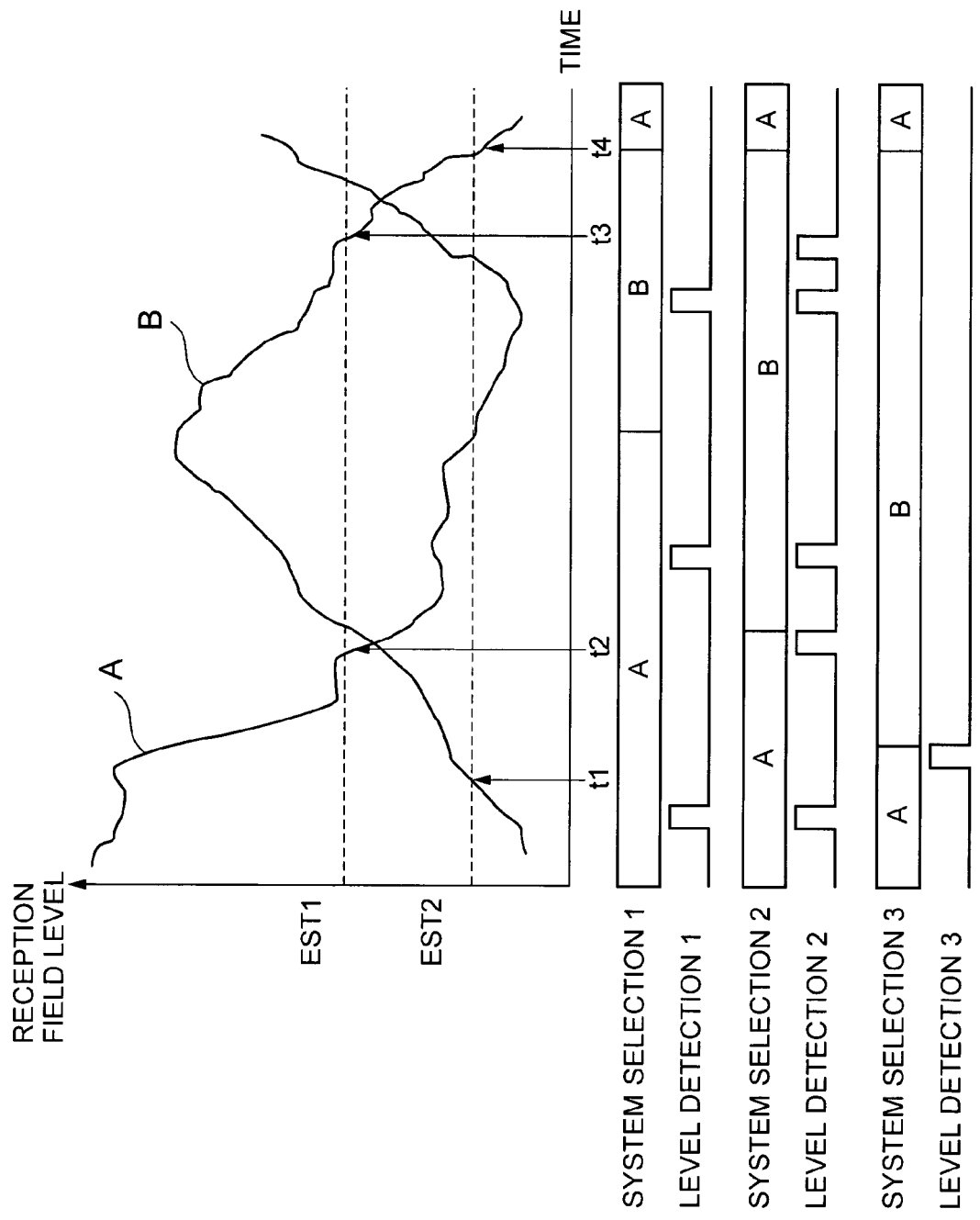
FIG. 7 comprises graph and a timing chart showing examples of communication system switching-over.

FIG. 7 comprises graph and a timing chart showing examples of the control method. The graph in the upper part of FIG. 7 shows the relationship between the reception field levels of the first communication system A and the second communication system B and the lapse of time. The reception field level of the first communication system A drops with the lapse of time, down to the threshold (Est1) by time t2. The reception field level of the second communication system B gradually increases, reaching the same level as the threshold (Est2) by time t1. Thus the terminal becomes able to communicate with the second communication system B at time t1. The reception field level of the second communication system B, after an increase, drops to the threshold (Est1) by time t3 and further to the threshold (Est2) by time t4. After time t4, the terminal becomes unable to communicate with the second communication system B.

The chart in the lower part of FIG. 7 shows the relationship between the selected communication system and the level detecting action. System selection 1 and level detection 1 represent a conventional control method. The terminal detects the reception field level of another communication system at every prescribed interval of time. By this control method, however, the terminal selects, when communication with the communication system selected becomes impossible, another communication system in accordance with the threshold (Est2). System selection 2 and level detection 2 represent a combination of the conventional control method and the present invention. In this case, the communication system B has priority. At time t2, the reception field level of the communication system A, that is selected, reaches the threshold (Est1). Then, the terminal detects the reception field level of the communication system B. At time t2, the terminal can communicate with both the communication system A and the communication system B. However, since the communication system B has priority, the terminal selects the communication system B. At time t3, when the reception field level of the communication system B has dropped to the threshold (Est1), the terminal detects the reception field level of the communication system A. By time t3, the communication system A will have reached a level where communication is possible. However, the communication system A has no priority. Accordingly, when the communication system B has become unable to communicate at time t4, the terminal selects the communication system A. By another method according to the invention, even if the communication system A has no priority, the terminal can select the communication system A at time t3. System selection 3 and level detection 3 represent still another control method. The user of the terminal, when time t1 is over, operates the terminal. This operation would be, for instance, unfolding a foldable terminal or manipulating the operating unit or the specific key. Upon detection of any such operation, the terminal selects the communication system B having priority. However, even if the communication system B has no priority, the terminal can select the communication system B. In the above-described case, if the communication system to be selected is at or below the threshold (Est2) and communication with the currently selected communication system is possible, the current selection will remain in effect.

The wireless communication terminal and the control method therefor described above make possible prompt switching-over to another communication system which is not selected, especially to a communication system having priority.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A wireless communication terminal, comprising:
an operating unit;
reception field level detecting means for detecting a threshold field level of a received radio wave, including a determination of whether the threshold field level has been detected;
a control unit for controlling the terminal;
a storage unit for storing said detected threshold field level;
a display unit and a speaker unit;
a plurality of wireless communication units for matching communication systems, including a first communication system that is currently selected, each of the plurality of wireless communication units respectively matching a different communication system; and
switch-over means for switching over from one to another of the wireless communication units, wherein:
if the terminal is busy with a call at a prescribed time, the terminal is scheduled to initiate execution of detection of reception of a threshold field level of a second communication system after the call ends,
if the terminal is not busy at the prescribed time, the terminal initiates an execution of detection of reception of the threshold field level of the second communication system,
the terminal initiating the execution of detection of the reception of the threshold field level of the second communication system when the reception of the threshold field level of the first communication system that is currently selected has become equal to or below a first threshold,
the terminal selects one of the communication systems on a basis of the reception of the threshold field level of the first communication system and of the threshold field level of the second communication system, and
the terminal issues a notice signal when the second communication system has priority and communication with the second communication system is possible, the notice signal being at least either a display on the display unit or a sound emitted by the speaker unit.

2. The wireless communication terminal, as set forth in claim 1, wherein:
the terminal selects the second communication system when the reception of the threshold field level of the first communication system is equal to or below a second threshold that is lower than the first threshold and communication with the second communication system is possible.

3. The wireless communication terminal, as set forth in claim 1, wherein:
the terminal selects the second communication system when communication with the second communication system is possible.

4. The wireless communication terminal, as set forth in claim 1, wherein:
the terminal selects the second communication system when the second communication system has priority and communication with the second communication system is possible.

5. The wireless communication terminal, as set forth in claim 1, further comprising:
a timer for generating the prescribed time at prescribed intervals of time.

6. The wireless communication terminal, as set forth in claim 1, further comprising:
a detection unit for detecting a prescribed operation of the terminal wherein:
when the prescribed operation is done at the terminal, the terminal executes detection of the reception of the threshold field level of the second communication system.

7. The wireless communication terminal, as set forth in claim 6, wherein:
the terminal selects the second communication system when communication with the first communication system is impossible and communication with the second communication system is possible.

8. The wireless communication terminal, as set forth in claim 7, wherein:
the terminal determines possibility or impossibility of communication according to a prescribed threshold.

9. The wireless communication terminal, as set forth in claim 6, wherein:
the terminal selects the second communication system when the second communication system has priority and communication with the second communication system is possible.

10. The wireless communication terminal, as set forth in claim 6, wherein:
the terminal is foldable.

11. The wireless communication terminal, as set forth in claim 10, wherein:
the prescribed operation comprises an operation to unfold the terminal.

12. The wireless communication terminal, as set forth in claim 6, wherein:
the prescribed operation comprises an operation on the operating unit.

13. The wireless communication terminal, as set forth in claim 6, further provided with:
a specific key, wherein the prescribed operation comprises an operation on the specific key.

14. A control method for a wireless communication terminal permitting use of a plurality of communication systems, including a first communication system that is currently selected, said method comprising:
if the terminal is busy with a call at a prescribed time, scheduling to initiate execution of a detection of a reception of a threshold field level of a second communication system after the call ends;
if the terminal is not busy at the prescribed time, initiating execution of detection of reception of the threshold field level of the second communication system, said initiating execution of detection of the reception of the threshold field level of the second communication system occurring when the reception of the threshold field level of the first communication system has become equal to or below a first threshold; and
selecting either communication system on a basis of the reception of the threshold field levels of said two communication systems.

15. The control method, as set forth in claim 14, further comprising:
issuing a notice signal when the second communication system has priority and communication with the second communication system is possible.

16. The control method, as set forth in claim 14, further comprising:
selecting the second communication system when the second communication system has priority and communication with the second communication system is possible.

17. The control method as set forth in claim 14, further comprising:
detecting whether or not a prescribed operation has been done on the terminal;
detecting, when the prescribed operation has been done, a reception of the threshold field level of the second communication system; and
selecting either communication system on a basis of the reception of the threshold field levels of said two communication systems.

18. The control method, as set forth in claim 17, wherein:
the terminal is foldable, and said prescribed operation comprises an operation to unfold the terminal.

19. The control method, as set forth in claim 17, wherein:
the prescribed operation comprises an operation on the operating unit of the terminal.

20. The control method, as set forth in claim 17, wherein:
the terminal is provided with a specific key, and said prescribed operation comprises an operation on the specific key.

21. The control method, as set forth in claim 17, further comprising:
issuing a notice signal when the second communication system has priority and communication with the second communication system is possible.

22. The control method, as set forth in claim 17, further comprising:
selecting the second communication system when the second communication system has priority and communication with the second communication system is possible.

23. The control method, as set forth in claim 14, further comprising:
selecting the second communication system when the reception of the threshold field level of the first communication system is equal to or below a second threshold that is lower than the first threshold and communication with the second communication system is possible.

* * * * *